US010036821B2

(12) United States Patent
Corcoran et al.

(10) Patent No.: US 10,036,821 B2
(45) Date of Patent: Jul. 31, 2018

(54) USER SUITE FOR INTERACTIVE OPTIMAL STACKING OF WIDE AZIMUTH SEISMIC DATA (71) Applicant: SHELL OIL COMPANY, Houston, TX (US)

(72) Inventors: Chris Thomas Corcoran, Houston, TX (US); Jonathan Lewis Sheiman, Houston, TX (US); Mark Edward Stockwell, Sugar Land, TX (US)

(73) Assignee: SHELL OIL COMPANY, Houston, TX (US)

( * ) Notice: Subject to any disclaimer, the term of this patent is extended or adjusted under 35 U.S.C. 154(b) by 294 days.

(21) Appl. No.: 15/037,196

(22) PCT Filed: Nov. 17, 2014

(86) PCT No.: PCT/US2014/065884
§ 371 (c)(1),
(2) Date: May 17, 2016

(87) PCT Pub. No.: WO2015/077170
PCT Pub. Date: May 28, 2015

(65) Prior Publication Data
US 2016/0274257 A1 Sep. 22, 2016

Related U.S. Application Data
(60) Provisional application No. 61/906,263, filed on Nov. 19, 2013.

(51) Int. Cl.
G06K 9/00 (2006.01)
G01V 1/36 (2006.01)
G01V 1/34 (2006.01)

(52) U.S. Cl.
CPC .............. G01V 1/362 (2013.01); G01V 1/345 (2013.01); G01V 2210/165 (2013.01)

(58) Field of Classification Search
CPC combination set(s) only.
See application file for complete search history.

(56) References Cited

U.S. PATENT DOCUMENTS

| 5,838,634 A * | 11/1998 | Jones ..................... G01V 1/282 367/73 |
| 7,986,319 B2 | 7/2011 | Dommisse et al. |
| 8,098,543 B2 | 1/2012 | Bachrach et al. |
| 2008/0243749 A1* | 10/2008 | Pepper ..................... G01V 1/34 706/47 |
| 2011/0107270 A1 | 5/2011 | Wang et al. |
| 2012/0130643 A1 | 5/2012 | Ozdemir et al. |

(Continued)

Primary Examiner — Alex Liew (57) ABSTRACT

A method for generating an improved stack from wide azimuth data. This is accomplished by displaying gather traces in a geometrically sensible way that depends on gather and processing type. Once a gather is available in such a manner, a geoscientist can use various geometric or freehand shapes to indicate which traces from the gather to stack and which to ignore. Given sufficient computing power, this can be done interactively, allowing a geoscientist to determine a set of traces that create an optimal stack at a single location in the output cube. Multiple locations can be improved in this manner and a final stack can be generated that contains a blended agglomeration of all of the improvements.

20 Claims, 6 Drawing Sheets (56) References Cited

U.S. PATENT DOCUMENTS

| | | |
|---|---|---|
| 2012/0155218 A1 | 6/2012 | Beasley et al. |
| 2012/0257796 A1* | 10/2012 | Henderson ............... G01V 1/32 382/109 |
| 2013/0077440 A1 | 3/2013 | Cao et al. |
| 2014/0200816 A1* | 7/2014 | Peng ........................ G01V 1/32 702/16 |

* cited by examiner

USER SUITE FOR INTERACTIVE OPTIMAL STACKING OF WIDE AZIMUTH SEISMIC DATA

FIELD OF THE INVENTION

In one aspect, the invention relates to a method for optimizing an image of wide azimuth seismic data using a processor and display device. In another aspect, the invention relates to a system for displaying wide azimuth seismic data.

BACKGROUND OF THE INVENTION

Oil and natural gas are crucial commodities in the world's supply of energy resources. As such, the location and utilization of subsurface resources is an important activity in the energy industry, with several companies dedicating significant resources to the location and extraction of oil and natural gas from beneath the earth's surface.

To locate an oil reservoir, researchers use various techniques. One such technique is volumetric seismic data mapping. Seismic data is obtained by generating seismic source waves that are transmitted into the earth and reflected. The reflected signals can be recorded and computationally processed to allow researchers to visualize the volume of these materials in three dimensions. This information, in turn, allows researchers to predict where hydrocarbons might be found below the surface of a region. Recent technological advances have allowed researchers to visualize and track seismic volumetric data through the display of complex, virtual three-dimensional images on interactive machines.

Typically, seismic data comprises a large collection of seismic traces, each trace representing the acoustic signal detected by a remote sensor after the signal has been transmitted by a seismic source and passed through the subsurface. A number of seismic traces can be generated from a single sensor by moving the seismic source or using additional seismic sources at different locations. This collection of seismic traces can image a broad area. A researcher or processer might sort the traces into one or more types of gather. Gathers made up of traces that are processed and selected to image the same location in the earth are then stacked to form an output 3D seismic volume. Stacked 3D seismic volumes are generally used by seismic interpreters to help predict whether that subsurface region contains hydrocarbons. Various imaging algorithms might be employed before or after stacking that blend the data across traces in complex ways to improve the final image.

Although this approach is an intuitive method for inspecting the quality of potential drill sites, there are some associated limitations. The quality of the underlying data organized into a stack determines whether the stack itself offers useful information. In some cases, the seismic sensors will record false signals or "noise" that may negatively impact the quality of the final stacked 3D seismic volume. For example, several subsurface materials may reflect the same wave from a seismic source multiple times before it reaches a data sensor. In areas of complex geology, various traces may contain significantly less signal because the majority of the acoustic energy is reflected or refracted away from your sensor or they may be contaminated by various noises that make the original signal difficult to distinguish.

It is often difficult to acquire clean data that reflects the underlying sediments in complex geologic areas. When exploring for hydrocarbons in such areas, it is common to employ "wide azimuth" scanning, which involves a number of techniques to shoot seismic over the same area, but from different directions. Such datasets can be treated individually, but when they are instead composited into a single dataset, this becomes a Wide AZimuth (WAZ) dataset. Recently, high-channel-count recording systems and high-productivity vibroseis techniques have created a revolution in onshore 3D seismic productivity, enabling the move from sparse to high-density WAZ acquisition and multiplying the data volume to include data in five dimensions: inline, crossline, offset, azimuth and time. Nonetheless, seismic interpretation systems tend to use the data in a single-fold three-dimensional arrangement. The quality of data may be further compromised when there are near surface scatterers, in the case that salt or basalt is covering reservoirs, or in any one of a number of other situations.

While simple stacking of all the data is usually an improvement over a single azimuth stack, a better result can be obtained by separating out those traces that do not have sufficient signal and exclude them from the final stack.

Existing attempts to address this problem generally take a mathematical approach. Researchers may develop and employ complex mathematical algorithms that seek to automate the process of identifying which traces contain signal and which do not and then exclude low signal traces from the final stack. While generally successful, it is not always possible for such algorithms to correctly decide which traces have signal and which have noise, particularly in complex areas.

Other, less sophisticated approaches for managing noisy data are also available but their usefulness is inherently limited. One approach is for researchers to include only data traces from one sector (e.g. the northeast) into the final stack and exclude all others. It is not clear that any one of the sector stacks is optimal and the practical matter of interpreting from multiple datasets is problematic.

Thus, creating an optimal stack is a persistent problem in the field of seismic interpretation and increases the challenge of locating valuable subsurface energy resources. The prospect of optimizing the stack by excluding those traces with insufficient signal from large arrays of seismic data would allow for a significantly improved image of the subsurface.

SUMMARY OF THE INVENTION

In one aspect, the invention provides A method for optimizing an image of wide azimuth seismic data using a processor and display device, comprising:

a) providing an original volume of wide azimuth seismic data to the processing system, wherein the seismic data volume comprises a plurality of traces from a plurality of gathers;

b) using the processing system to generate a 3D image of the seismic data on said display device, wherein the traces are positioned in said display according to a predetermined arrangement;

c) selecting a control point within the seismic volume;

d) providing a virtual mask and using the virtual mask to suppress one or more of said traces from the original volume optimal stack;

e) creating an adjustment to the 3D image based on the partial masking of step c);

f) optionally, repeating steps c)-e) for a desired number of additional control points; and g) outputting an image comprising the original volume of seismic data combined with the adjustment or adjustments.

In another aspect, the invention provides a system for displaying wide azimuth seismic data, comprising:

a processing system having a display output and configured to be controlled by at least one user;

an input device operatively connected to said processing system such that said user can use said input device to transmit signals to said processing system;

a 3D volume of seismic data displayed on said display of said processing system and comprising a plurality of data traces; and a user-controllable data mask overlaid on said displayed seismic data in a manner directed by said input device, wherein said user-controllable data mask suppresses at least one of said plurality of traces so as to create a masked volume; wherein said processing system blends said 3D volume of seismic data with said masked volume and displays a modified 3D volume.

BRIEF DESCRIPTION OF THE DRAWINGS

For a more detailed understanding of the invention, reference is made to the accompanying wherein.

DETAILED DESCRIPTION OF A PREFERRED EMBODIMENT

The invention relates to reduction of noise in three-dimensional (3D) simulations generated by an array of seismic volumetric data. In particular, the invention relates to providing a seismic interpreter with tools for manually selecting favorable data and generating a blended volume for the relevant data areas based on the interpreter's selection.

As used in this specification and claims the following terms shall have the following meanings:

"Multi touch" refers to an electronic display screen with which the user can interact by pressing one or more fingers against the screen at once, capable of recognizing several forms of input (alone and in combination) including tapping, dragging, pinching, and performing multi-finger motions with greater or fewer points of contact. A pen-like stylus is often available to provide more detailed input.

"Seismic sensor" refers to a piece of equipment that generates a small electrical signal in response to minute vibrations such as subsurface waves originating from a seismic source. Such sensors are connected to equipment that converts the electrical signal into recordable data, which is later organized into an array or other data structure suitable for continued processing. One example of a seismic sensor is a geophone. Another is a hydrophone.

"Trace" refers to seismic data recorded from a single seismic sensor. It also refers to a vertical array of seismic data from a processed seismic volume.

The terms "seismic cube" or "cube", and "seismic volume" or "seismic image volume", may be used interchangeably.

Wide Azimuth" or "WAZ" refers to a technique for gathering seismic data in multiple acquisition directions. It becomes Wide Azimuth when the aspect ratio of the recording patch is greater than 0.5. The aspect ratio is defined as the cross-line dimension of the patch divided by the in-line dimension. Narrow azimuth patches may have aspect ratios as low as 0.2, while wide azimuth patches may have aspect ratios as great as 0.8-1.0. WAZ acquisition may be performed onshore or offshore, as is known in the art. The concepts disclosed herein are not limited to a particular aspect ratio, mode of acquisition, or other hard-ware related feature.

Preferred embodiments of the invention provide a user-controlled apparatus for enhancing the quality of stacked seismic data. The apparatus preferably comprises a processing system including a display device, such as a monitor, and an instrument for a user to control and interact with the processing system. The control instrument may be any conventional tool such as a mouse or a keyboard, but is preferably a large multi touch-capable screen supporting both touch and stylus. The processing system is capable of 3D display and receives user commands via signals relayed from the control instrument. The specific mechanics of seismic data collection are known in the art and not necessary to an understanding of this specification.

In general, when seismic data are collected, energy from a number of seismic sources, generally fired sequentially, is recorded by a number of seismic detectors, often called receivers. The data from one source recorded by one receiver is a time series sometimes called a trace. A plurality of traces that have a common property form a gather. A common property may for instance be a common acquisition parameter. For example the traces from all sources recorded by a single receiver would be called a receiver gather, or the collection of traces having a similar source to receiver offset would be called a common offset gather. The traces in the gather may or may not be regularly spaced. Traces in a gather may be processed, or corrected, by various methods that are well known to those skilled in the art of seismic data processing, such as migration. Herewith an output volume is created that images the subsurface. Each processed gather creates an independent image volume of at least part of the full subsurface volume and image volumes from separate gathers generally overlap. These separate image volumes may then be combined, or stacked, to increase the areal extent of the final image volume, as well as generally to improve the signal quality of the final image. For instance, the signal-to-noise ratio may be improved as a result of stacking.

Another gather that is useful in enhancing the final image volume is an image gather, which is the collection of all processed traces that contribute to an output image location. For example if receiver gathers were processed separately to give a set of image volumes, then resorting this collection of data to the image locations would give a receiver-to-image gather, or one output trace from each receiver that contributed to the image at a particular location.

Modern surface seismic data as acquired can be thought of as five-dimensional (5D), described by the source and receiver surface coordinates and recording time. The final image volume is three dimensional (3D), but for processed image volumes of gathers five or more dimension may be useful to characterize these data. For instance if receiver gathers are processed then the surface spatial (2D) coordinates of the receiver combined with the three dimensional image volume coordinates give five dimensions.

Additional independent image volumes can be created by processing the input gather volumes somewhat differently, such as by migrating using a different velocity model, a technique well known to those skilled in the art of seismic processing.

A simplified explanation of the present invention is that it consists of constructing an improved seismic output image volume by starting with an original seismic output image volume and replacing selected portions of that volume with corresponding portions selected from the many independent image volumes from individual gathers or gathers that have all been processed slightly differently. The interpreter first chooses a location on the output volume he would like to see improved. The selected location may be referred to as the "control point." Next, the system cuts out, for example, a melon ball-shaped piece of seismic from one of the alternative image volumes and inserts it into the original seismic image volume and blends the edges. When the data is located on a sufficiently fast computer system (for example, distributed across a computer cluster), the system can work interactively from an entire 5D, wide azimuth (WAZ), pre-stack dataset and can do the final stacking into 3D on the fly. The present invention gives a better result than merely piecing together an improved image from already processed WAZ data; by spreading out an entire WAZ dataset over a computer cluster, stacking of all of the gathers can be done at interactive speeds. Still further, the system allows the interpreter to change the way the 5D data is stacked to watch for improvements as the traces used in the stack are interactively modified. This is where the real value of the present approach lies. It allows the interpreter to interactively determine the best way to stack the 5D WAZ data to get a better final image. Because there is no single best stacking choice for the entire cube, there is a need to spatially vary the choice of which traces make up the optimal stack. The control point nature of the present system allows for this necessary spatial variation. The set of traces that should be added to the stack at a particular control point is referred to as a "mask." To facilitate selection of a beneficial mask for a given control point, the system provides a number of interactive tools that allow a quick examination and comparison of several possible masks at the current control point. These tools include a polar mask editor, the spotlight mask editor, and a freehand mask editor (all described below).

Figure 1:
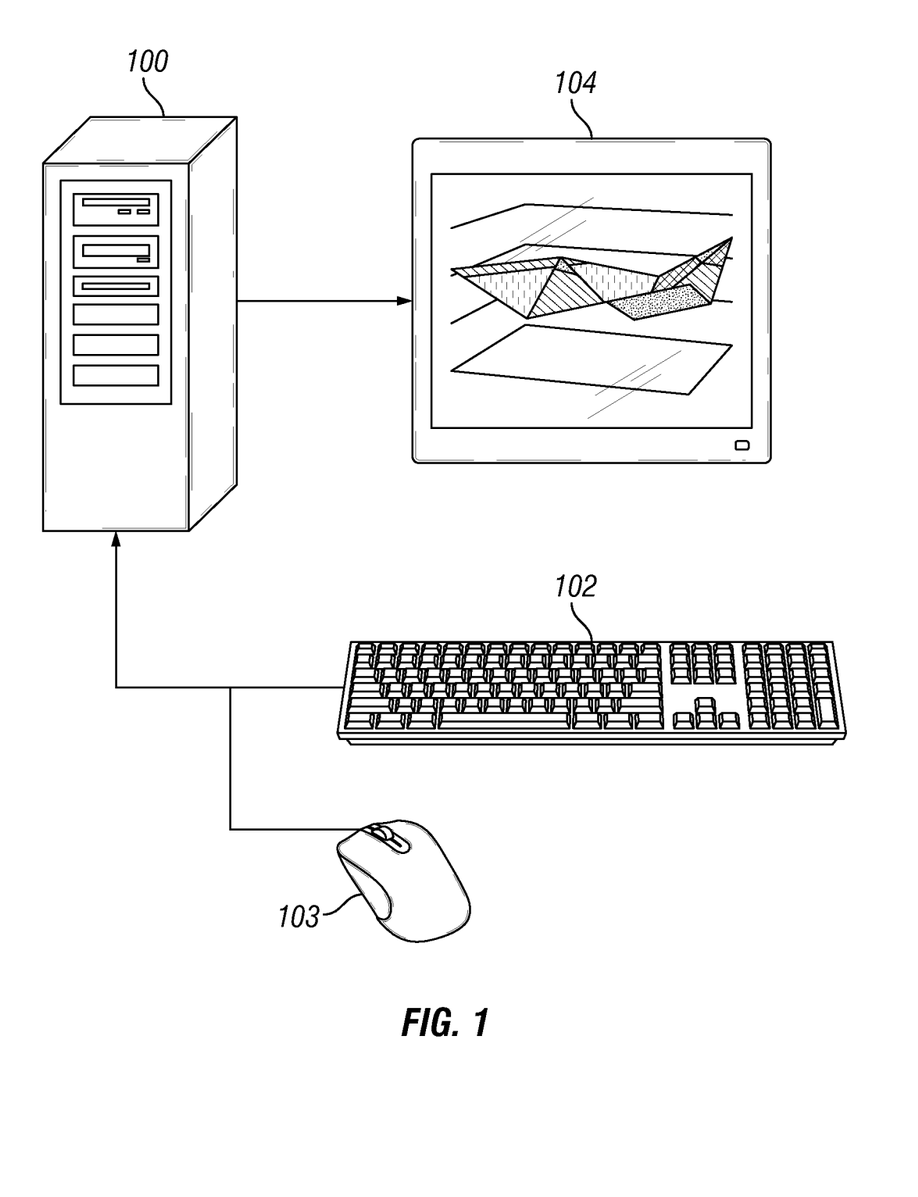
FIG. 1 is a schematic diagram of the relationship between a processing system, input device, display, and 3D volume of seismic data.

Referring initially to FIG. 1, the hardware components of a simplified, illustrative embodiment of the invention include a processing system 100 capable of processing and modeling a graphical simulation of a data array in three dimensions. As is well known, processing system 100 may be a single computer, laptop, or similar device, as well as a collection or network of many connected computers. While the figure shows a single workstation connected to a display, it will be understood that real systems are likely to include a two-way connection between the workstation and a computer cluster.

Processing system 100 is operably connected to a display device 104, preferably a touch screen or a monitor, which displays images according to signals communicated by software on the processing system 100, both automatically and when directed by a user through an input device. The input device may be any component capable of receiving commands from one or more users and transmitting them to a processing system 100, including, a keyboard 102, a computer mouse 103, or a touch screen 104. If a touch screen 104 is used, as is preferable, the touch screen may function as both an input device and a display device. However, any electronic input device including keyboards, mice, controllers, buttons, remote controls, trackballs, cameras, etc. may be used consistently with this embodiment. The processing system 100 displays or animates user commands on a display device through a three-dimensional representation of data that communicates information and options to a user.

It will be understood that the Figure is merely illustrative of one possible hardware system. In actual operations, the data would typically be stored on a computer cluster and the software would preferably run on that cluster. The 3D scene generated by the system would preferably be turned into compressed video, which in turn be sent to a browser running on an individual machine similar to the one in the diagram.

Figure 2:
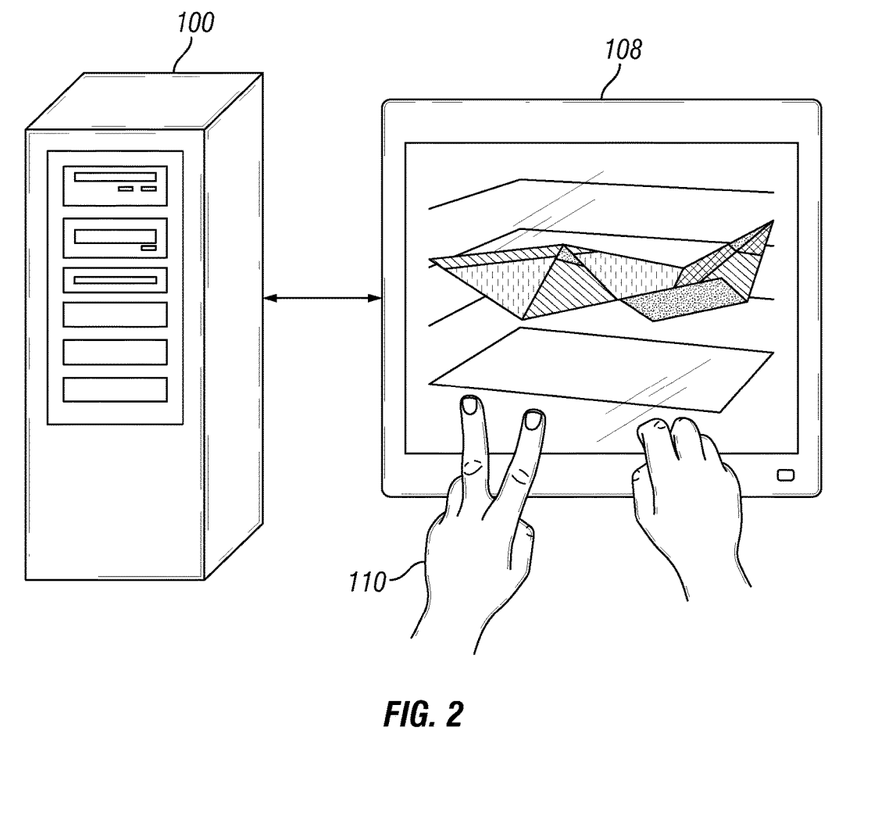
FIG. 2 is a schematic diagram of a preferred embodiment of the invention where the input device is a touch screen with multi-touch functionality.

Turning to FIG. 2, a simplified and preferred embodiment of the invention is shown. The simplified embodiment effectively merges two separate elements of the previous configuration, display 104 and input device 102, into a single multi-touch capable touch screen 108. The use of a multi-touch component 108 is preferable because it gives users a direct and intuitive method of interacting with the visual representation of seismic data 106, which in turn improves the seismic interpreter's ability to optimize the displayed image. The processing system 100 is capable of recognizing a library of multi-touch inputs performed by a user's hand 110 in contact with multi-touch screen 108. Such inputs include tapping, dragging, pinching, etc. and are generally known to those skilled in the art. By way of example, in one preferred embodiment, a single touch may be used to rotate the image, a pinch gesture may be used to zoom and translate, and a tap, tap-drag gesture may be used to identify and then move a seismic slice. Combinations of these inputs allow users to select a desired seismic section at the beginning of a workflow by double-tapping the screen and to drag and translate the selected seismic section with a single finger. Inputs such as this allow users to manipulate a representation of 3D data more efficiently and intuitively than with other input devices and methods.

By way of further example, and with reference to commonly-owned application with application number U.S. 61/906,266 filed 19 Nov. 2013, one possible configuration uses one finger to rotate the scene and the pinch gesture to zoom and translate. Thus, when it is desired to move a slice, instead of using a single finger to move the slice—because the single finger touch is already used for rotation—the preferred system allows the user to select the slice by tapping on the slice, after which it can be dragged with a single finger. Once the finger is lifted, the system reverts to single finger=rotation mode.

In the presence of complex geology, not all source/receiver pairs generate a trace that contains recognizable signal. Further, in many cases, those pairs least likely to contain signal can be heavily influenced by direction. While certain imaging techniques complicate this notion by smearing the directional information over the gather, enough directional information remains to allow direction to be used as a guide to which traces should be used in the final stack and which traces removed. By distributing the gather traces in such a way that when viewed from above (2D map view), each gather trace is located in a sensible way with respect to their acquisition and processing, it is possible to use various geometric shapes to quickly examine the effect on the stack imposed by direction. For example, when using receiver-to-image gathers (from all of the receivers that contributed to an image location) from an Ocean Bottom Seismic (OBS) dataset, it may be advantageous to place each gather trace at a location that is indicative of the OBS receiver that recorded it. Likewise, given more conventional processing of streamer WAZ data, one might place each gather trace at the same offset and azimuth from the seismic source as its receiver.

Figure 3:
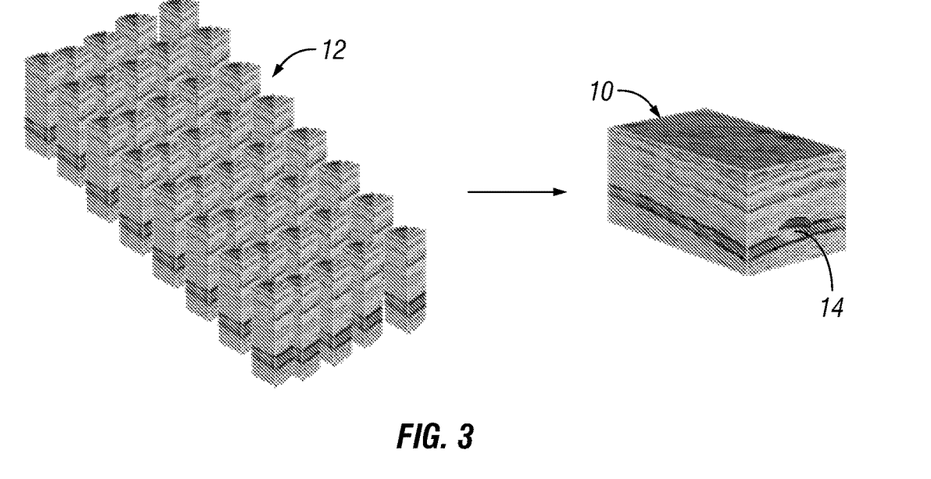
FIG. 3 schematically illustrates a plurality of seismic traces, an exemplary seismic volume, and a control point.

Referring now to FIG. 3, the present process begins with a "background volume" 10, which is preferably the stacked volume, formed from a plurality of traces 12, that has the best properties based on the initial data. The present process uses substacks of the WAZ data to improve the background volume in small neighborhoods of interpreter-selected control points. To begin the process of improving the image, the interpreter will select a specific point 14, called a control point. Control point 14 is the point in the volume at which the operator wishes to improve the image.

Figure 4:
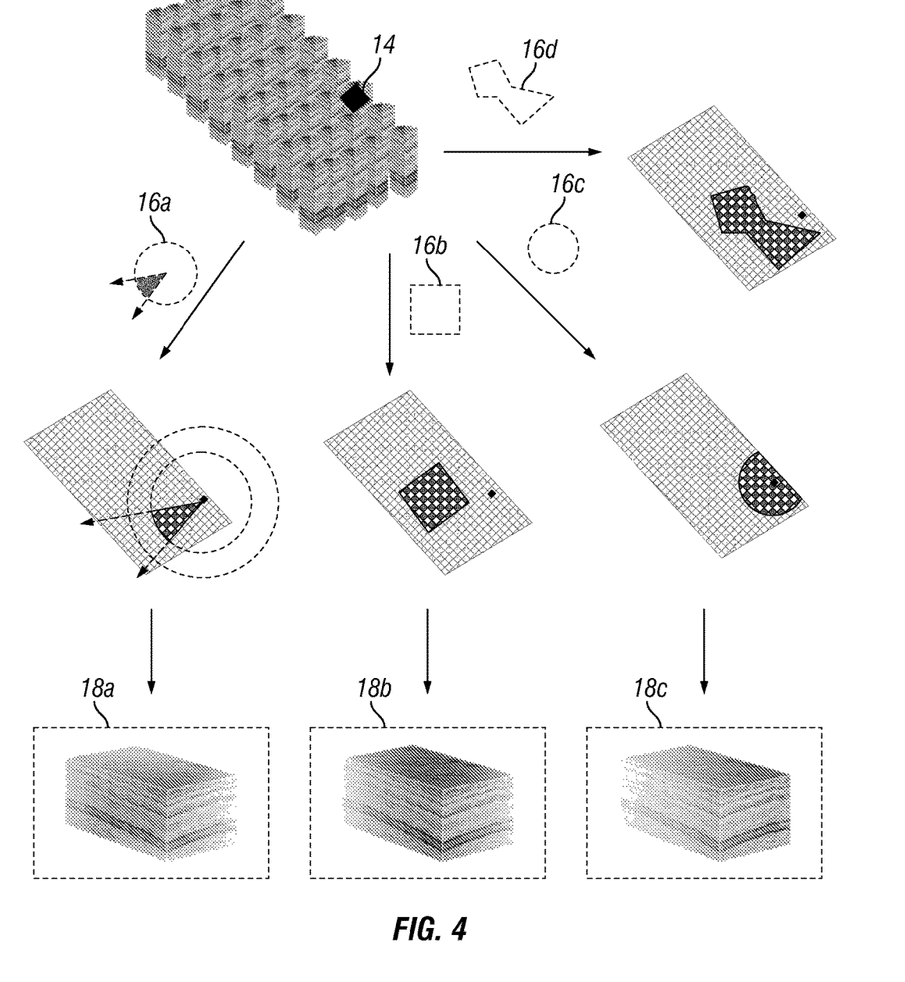
FIG. 4 is a schematic illustration of the concepts underlying this invention, including the selection of one or more masks for the enhancement of signal at the control point.
Figure 5:
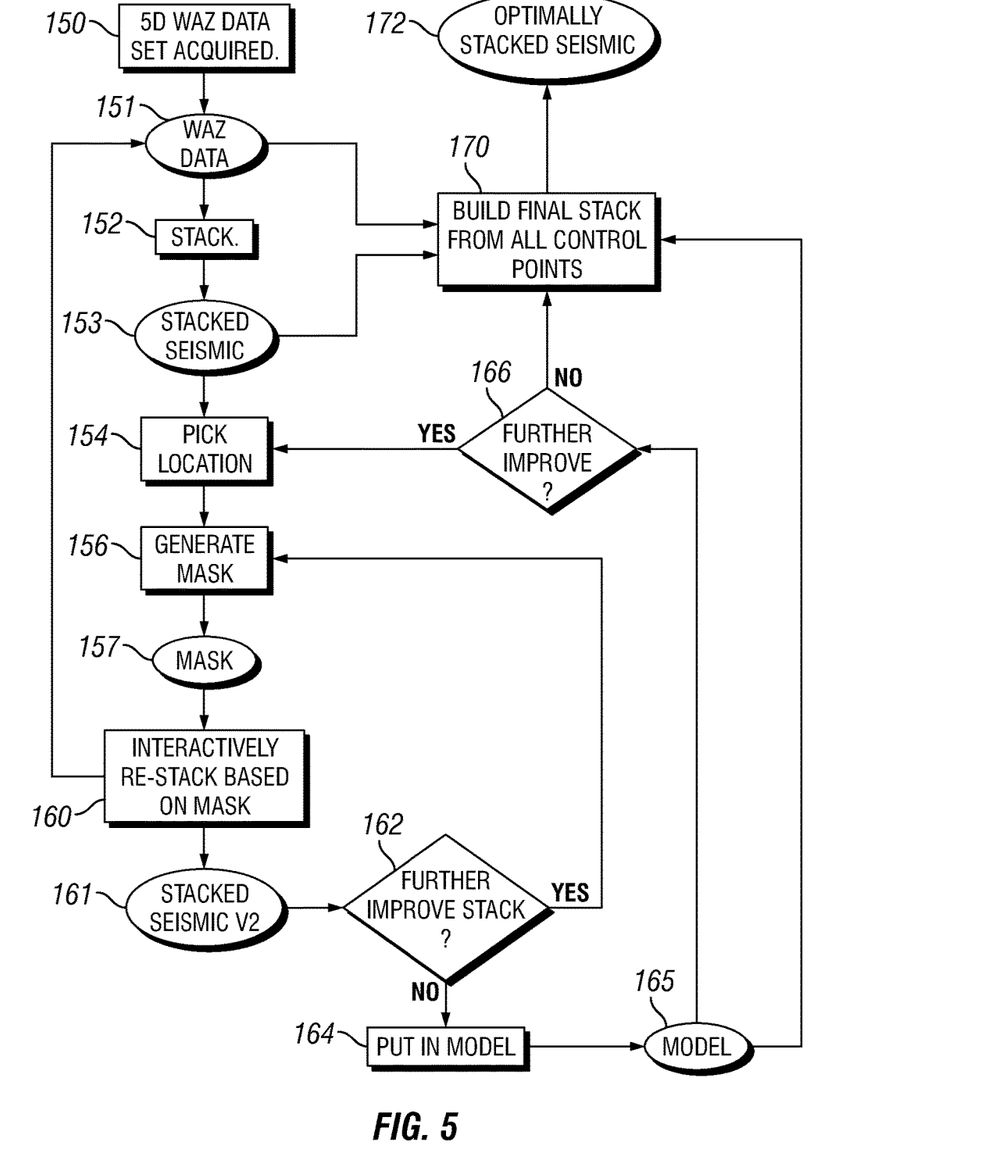
FIG. 5 is a flowchart illustrating a first embodiment of a process in accordance with the invention.

Turning to FIG. 4, once a control point 14 has been selected, the present system presents the interpreter with one or more interactive data masks 16. A mask is a selection of which traces in a gather are to be used in the final stack. As shown in FIG. 4, possible mask shapes include a polar wedge 16a, square 16b, circle 16c, and freeform (operator defined) 16d. It will be understood that the mask shapes illustrated in the Figure are merely illustrative and that the system can be programmed to incorporate any desired mask shape. To facilitate interaction, control point 14 may be illustrated on the map view.

Still referring to FIG. 4, the system allows the user to use the selected mask shape 16 to generate new versions of the seismic volume, using only the traces in each gather that fall within the mask. The mask can be moved across the array of gather traces and the effect of such movement is that the stack is interactively regenerated based on the masked traces and the visible seismic slices are updated, allowing the operator to observe the effect of that movement on the quality of the displayed output. This interactive capability allows the interpreter to examine a large number of substacks as they try to find the best one possible.

To assist the operator in defining and placing the mask, the traces may be color coded by a suitably selected attribute whereby the color coding corresponds to a value of the selected attribute. Suitable attributes for this purpose are attributes that are relevant for selecting gather traces. Examples of suitable attributes include signal-to-noise ratio estimates, cross correlation, illumination. Many others are possible.

One particularly preferred approach entails superimposing a circle, shown as mask 16c, on the map view of the gather such that the circle is centered on the control point. The entire gather may be contained inside the circle. This would generate what we call the full stack. Then, one or more sectors of the circle can be selectively suppressed in order to allow the interpreter to decide which traces of the gather should be included in the stack and which should be ignored. The angle used to define each sector (or sectors) can be can be increased or decreased interactively if desired by directly dragging elements of the mask graphic. Multi-touch is particularly effective for this. Alternatively or in addition, each sector can be divided radially, by using a smaller circle centered at the same point as the outer circle. This allows the interpreter to further refine the stack by using traces in the sector, but inside the smaller circle or outside the smaller circle, thus adding the notion of "nears," "mids," and "fars" to the stack. In the embodiment illustrated in FIG. 4, the near traces are selected. In preferred embodiments, all of the elements of the radial mask can be interactively adjusted directly on the graphic display. In particular, the radial elements can be rotated smoothly around the origin of the circle, thus allowing an interpreter to quickly understand the directional impact of his data selection on the final stack.

When the user applies a mask to a gather, only those traces inside the mask are used to for the stack. This allows the interpreter to discern whether the removal enhanced the quality of the image. For further optimization, an embodiment of the invention offers additional methods for optimizing the masks. Using multi-touch inputs or any other suitable means, the user may resize, reorient, or reposition interactive mask 16 to determine where the mask will have an optimal effect. The user may then "save" mask 16 in a selected configuration, or delete it and try a different mask.

In preferred embodiments, the present system includes a freehand mask-editing option that allows the interpreter to create a user-defined mask 16d, using the knowledge and insight gained by applying other interactive masks. The user-defined mask may be more complex than the pre-programmed masks and may provide a better result by removing certain data from a stack while leaving a greater amount of usable data intact. This, in turn, may enhance the quality of data to a greater extent than would be possible if only the masks based on geometric shapes were used. If desired, the user may define and place one or more customized data masks alongside one or more predetermined data mask shapes in any desired combination.

A single mask is not typically enough to correct an entire volume. In fact, a single mask may have limited spatial applicability. The above techniques are preferably used to generate an optimal mask for each of several selected control points. Preferably, the user will select control points and select and position one or more masks for each control point until the stack is completely optimized or the interpreter is satisfied with the quality of data provided in the stack.

In a preferred embodiment, the processor preferably includes a blending algorithm. When the interpreter is satisfied that the selected mask configuration will define an improved seismic image, the resulting data set is used to generate a "blended" volume. This is a single volume in which the WAZ data is stacked in accordance with the edited sub-stacking masks in the model. Between interpreted locations, the software preferably estimates weights to be applied so as to balance the nearby masks in the model.

Because the process designed is primarily as an interpreter driven interactive workflow, it is generally not feasible to optimally stack an entire data volume. For this reason, the control point workflow was created to allow the interpreter to sharp-shoot only the most important areas. Once a number of control points are selected and a mask is generated for each control point, there must be two blending operations to complete the workflow. The first blending step is to blend between the control points. In this step, a new volume is generated that honors all of the selected control points. A seismic sample in this volume may be surrounded by many control points, and their influence must be accounted for in this stack. Accounting for this influence is a fairly standard gridding problem and there are a number of well-known techniques to accomplish this. This first blending step generates a volume that should improve the quality of the seismic but only in a neighborhood of each control point. At points that are farther from the control points, the data is less likely to be an improvement over conventionally processed seismic volumes, so neighborhoods around each control point are preferably defined by allowing the user to pick two radii. In one exemplary embodiment, one radius defines the vertical height of a spheroid of influence while the other radius defines the horizontal width of this spheroid. These spheroids are defined by the user as an estimate of how much of the final stack should be influenced by the first blended volume. More than one shape can be employed and a useful improvement is to add dip parameters to each spheroid so that they can be aligned with the underlying geology.

To carry out the second blending step, the best conventionally stacked volume is used as a background volume. This may be the full stack or it might be any other compatible processed volume. The spheroid shapes are used to cut "holes" in the background volume at each control point. These holes are filled with data from the first blended volume as defined above. Before being embedded, the substacked data is preferably gain matched to the data it is replacing and the edges are smoothed. Another user parameter defines the width of the smoothing operation.

When a user wishes to view the masked data together with the remaining data, the blending algorithm or functionality blends a local stack with the remaining seismic data such that the user views a continuous blended volume of seismic data.

Figure 6:
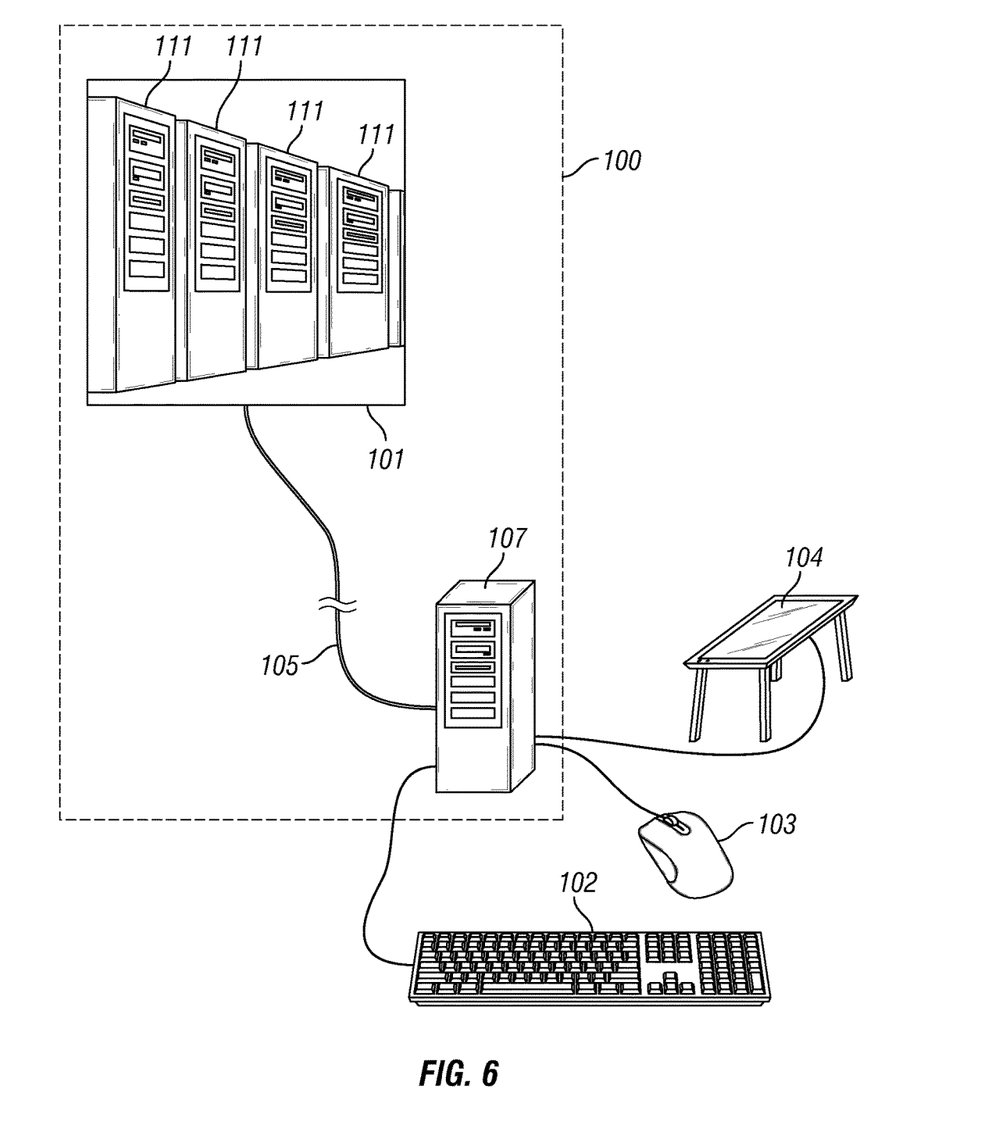
FIG. 6 is a schematic diagram illustrating a processing system comprising a computer cluster.

FIG. 6 is a flowchart illustrating an exemplary embodiment of a workflow in accordance with the present invention. As illustrated, the preferred workflow includes the following steps:

150—Acquire 5D wide azimuth data set (resulting in WAZ data 151)
152—Generate a stack from the wide azimuth data (resulting in Stacked seismic data 153)
154—Pick location for control point based on quality of data in the stack
156—Generate a mask by selecting a mask shape and obtaining corresponding mask data from masked traces (resulting in Mask 157)
160—Generate a revised stack from the mask data (resulting in Stacked seismic data v2 161)
162—Determine whether the stack could be further improved at that control point and if the stack could be improved further, repeat steps 156 and 160
164—If the stack could not be improved further, incorporate the new data in the model 165
166—Determine whether the model could be further improved and if the model could be improved further, repeat steps 154, 156, 160, and 162
170—If the model could not be improved further, incorporate the new data in a final stack including all control points
172—Output an optimally stacked seismic volume.

The model may comprise a list of control points and associated masks. Incorporating of the new data in the model (in step 164) may comprise adding that control point and the generated mask to the model. In step 170 the data may be blended together. Based on the interpreter's satisfaction or dissatisfaction with the final blended volume, the user may repeat the process by adding or removing control points, or by modifying the masks at existing control points. This continues until he or she is satisfied with the final display of data on screen. The present workflow creates a single coherent volume of seismic data without diminishing the usability of the good data.

FIG. 6 illustrates an embodiment wherein the processing system 100 comprises a computer cluster 101 on which the data is stored. The computer cluster 101 comprises a plurality of computers 111. The computer cluster 101 may be operably connected via a long-distance network connection 105 to a local computer 107. The software may be run on the computer cluster 101, or optionally on the local computer 107. The display device 104, and optional other input and/or output devices (such as the optional keyboard 102 and optional computer mouse 103) may be operably connected to the local computer 107. The display device 104 is suitably embodied like a draftsman's desk, comprising an inclined and nearly horizontal plane in which a touch screen may be integrated.

Although the preferred embodiments of the present invention have been described herein, the above description is merely illustrative. Further modification of the invention herein disclosed will occur to those skilled in the respective arts and all such modifications are deemed to be within the scope of the invention as described by the appended claims.

The invention claimed is:

1. A method for optimizing an image of wide azimuth seismic data using a processor and display device, comprising:
a) providing a wide azimuth seismic data set to the processing system, wherein the wide azimuth seismic data set comprises a plurality gathers each comprising a plurality of traces, and displaying images volumes of the plurality of gathers on said display device;
b) using the processing system to generate a stacked seismic volume from the wide azimuth seismic data and to generate a 3D image of the stacked seismic volume on said display device;
c) selecting a control point within the stacked seismic volume which indicates a location where the 3D image is to be improved;
d) providing a virtual mask and using the virtual mask to indicate which traces in the plurality of gathers are to be used in the control point in a final stack;
e) creating an adjustment to the 3D image using a substack of the wide azimuth seismic data set based on the virtual mask of step d);
g) outputting an image comprising the original stacked volume of seismic data combined with the adjustment or adjustments.

2. The method of claim 1 wherein step d) includes allowing a user to resize, reorient, or reposition the mask.

3. The method of claim 1 wherein step d) includes allowing a user to customize the shape of the mask.

4. The method of claim 1 wherein, preceding step g), repeating steps c)-e) for a desired number of additional control points.

5. The method of claim 4 wherein steps c), d) and e) are repeated at least twice.

6. The method of claim 1, wherein in step b) the traces are color coded in accordance with a selected attribute to facilitate placing of the mask.

7. The method of claim 1 wherein said data mask is selected from a group of pre-defined mask shapes.

8. The method of claim 7 wherein the pre-defined mask shapes include a shape selected from the group consisting of polar wedges, cones, rectangular prisms, spheres, ovoids, bitmasks, and general polygons.

9. The method of claim 1 wherein step c) comprises providing a plurality of data masks wherein each mask is used to suppress a portion of the seismic data.

10. The method of claim 9 wherein said plurality of data masks comprises at least one user-customized data mask and at least one predefined data mask.

11. The method of claim 9, further comprising the step of creating a blended volume by stacking the seismic data in accordance with the data masks and applying weights to the data between the masks.

12. The method of claim 11, further comprising the step of replacing a portion of the stacked seismic data volume from step b) with the blended volume.

13. The method of claim 1 wherein the image volumes in a step a) are displayed according to a predetermined arrangement.

14. The method of claim 13, wherein the predetermined arrangement comprises either:
   a) when using receiver-to-image gathers from an Ocean Bottom Seismic (OBS) dataset, placing each gather trace at a location that is indicative of the OBS receiver that recorded it, or
   b) when using WAZ data processed as offsets and azimuths, placing each gather trace at the same offset and azimuth from the seismic source as its receiver.

15. A system for displaying wide azimuth seismic data, comprising:
   a processing system having a display output and configured to be controlled by at least one user;
   an input device operatively connected to said processing system such that said user can use said input device to transmit signals to said processing system;
   image volumes of a plurality of gathers from a wide azimuth of seismic data set displayed on said display of said processing system, each gather comprising a plurality of traces;
   a 3D image of a stacked seismic volume displayed on said display of said processing system wherein the stacked seismic volume is generated from the wide azimuth seismic data set;
   a user-controllable control point within the stacked seismic volume which indicates a location where the 3D images is to be improved; and
   a user controllable data mask overlaid on said image volumes of said plurality of gathers in a manner directed by said input device, wherein said user-controllable data mask indicates which traces in the plurality of gathers are to be used in the control point in a final stack;
   wherein said processing system creates an adjustment to the 3D image using a substack of the wide azimuth seismic data set based on the data mask, and displays a modified 3D image comprising the original stacked volume of seismic data combined with the adjustment or adjustments.

16. The system of claim 15 wherein said input device comprises a multi-touch enabled touch screen capable of interpreting a library of gestures.

17. The system of claim 15 wherein said data mask is designed by said at least one user through said input device.

18. The system of claim 15 wherein said data mask comprises one of a polar wedge, a cone, a rectangle, and an oval.

19. The system of claim 15 wherein a plurality of data masks are displayed simultaneously on said display device of said processing system.

20. The system of claim 15 wherein the data traces are color coded in accordance with a selected attribute to facilitate placing of the mask.

* * * * *